United States Patent
Hamamoto et al.

(10) Patent No.: US 7,963,660 B2
(45) Date of Patent: Jun. 21, 2011

(54) ANTIGLARE HARD-COATED FILM

(75) Inventors: Daisuke Hamamoto, Ibaraki (JP); Hiroyuki Takao, Ibaraki (JP); Yuuichi Kimura, Ibaraki (JP); Katsunori Takada, Ibaraki (JP); Seiichi Kusumoto, Ibaraki (JP); Takayuki Shigematsu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 312 days.

(21) Appl. No.: 11/994,293

(22) PCT Filed: May 18, 2006

(86) PCT No.: PCT/JP2006/309905
§ 371 (c)(1),
(2), (4) Date: Dec. 28, 2007

(87) PCT Pub. No.: WO2007/000856
PCT Pub. Date: Jan. 4, 2007

(65) Prior Publication Data
US 2009/0086326 A1    Apr. 2, 2009

(30) Foreign Application Priority Data

Jun. 28, 2005   (JP) ................................ 2005-188553

(51) Int. Cl.
*G02B 27/00* (2006.01)
(52) U.S. Cl. ........................................ 359/601
(58) Field of Classification Search .................. 359/601, 359/609
See application file for complete search history.

(56) References Cited

U.S. PATENT DOCUMENTS

| | | | |
|---|---|---|---|
| 2003/0179456 A1 | 9/2003 | Uchida et al. | |
| 2004/0071986 A1 | 4/2004 | Shoshi et al. | |
| 2005/0063066 A1 | 3/2005 | Namioka et al. | |
| 2005/0152034 A1* | 7/2005 | Matsunaga | 359/493 |
| 2009/0087617 A1* | 4/2009 | Suzuki et al. | 428/147 |

FOREIGN PATENT DOCUMENTS

CN    1493889 A    5/2004
(Continued)

OTHER PUBLICATIONS

Notification of Transmittal of Translation of the International Preliminary Report on Patentability (Form PCT/IB/338) of International Application No. PCT/JP2006/309905 mailed Jan. 17, 2008 with Forms PCT/IB/373, PCT/ISA/237 and PCT/IB/326.

(Continued)

*Primary Examiner* — Joshua L Pritchett
(74) *Attorney, Agent, or Firm* — Westerman, Hattori, Daniels & Adrian, LLP

(57) ABSTRACT

There is provided an antiglare hard-coated film that can maintain antiglare properties and suppress a reduction in the display contrast of a display, when composed of a transparent plastic film substrate and an antiglare hard coat layer formed thereon. The antiglare hard-coated film 4 includes a transparent film substrate 1 and a hard coat layer 2 that is provided on at least one side of the transparent film substrate 1, contains fine particles 2b, and has an irregular surface, wherein the fine particles 2b have an average particle size of 6 μm to 15 μm and form irregularities with an average slope angle θa of 0.4° to 1.5°, and the antiglare hard-coated film satisfies the relation: {(the contrast ratio)/(the contrast ratio of a hard-coated film without the fine particles)}×100≧60%.

7 Claims, 1 Drawing Sheet

FOREIGN PATENT DOCUMENTS

| | | | |
|---|---|---|---|
| JP | 2002-82388 | A | 3/2002 |
| JP | 2002-372607 | A | 12/2002 |
| JP | 2003-4903 | A | 1/2003 |
| JP | 2003-248110 | A | 9/2003 |
| JP | 2003-279737 | A | 10/2003 |
| JP | 2004-191956 | A | 7/2004 |
| JP | 2005-077860 | * | 3/2005 |
| JP | 2005-84113 | A | 3/2005 |
| JP | 2005-92197 | A | 4/2005 |
| JP | 2005-122147 | A | 5/2005 |
| JP | 2005-134863 | A | 5/2005 |
| WO | WO 03/071316 | * | 8/2003 |
| WO | 2004-049018 | A1 | 6/2004 |

OTHER PUBLICATIONS

Japanese Office Action dated Nov. 12, 2007, issued in corresponding to JP Application Nos. 2006-136618.

International Search Report of PCT/JP2006/309905, date of mailing Jul. 4, 2006.

Chinese Office Action dated Feb. 6, 2009, issued in corresponding Chinese Patent Application No. 200680022958.4.

* cited by examiner $$\theta a = \tan^{-1}\left(\frac{h_1+h_2+h_3+\cdots+h_n}{L}\right)$$

ANTIGLARE HARD-COATED FILM

TECHNICAL FIELD

The invention relates to a hard-coated antiglare film comprising a transparent film substrate and a hard-coating layer formed on at least one side of the film substrate and to a method of manufacturing the same. More specifically, the invention relates to a hard-coated antiglare film that can be suitably used for optical devices such as polarizing plates and image displays such as cathode ray tubes (CRTs), liquid crystal displays (LCDs), plasma display panels (PDPs) and electroluminescence displays (ELDs) and to a method of manufacturing the same.

BACKGROUND ART

As LCDs, one of many types of image displays, have been technically improved to provide wide viewing angles, high resolution, high response, good color reproduction, and the like, applications of LCDs are spreading from laptop personal computers and monitors to television sets. In a basic LCD structure, a pair of flat glass substrates each provided with a transparent electrode are opposed via a spacer to form a constant gap, between which a liquid crystal material is placed and sealed to form a liquid crystal cell, and a polarizing plate is formed on the outside surface of each of the pair of glass substrates. In a conventional method for performing antiglare treatment, the surface of a polarizing plate having a sandwich structure of two transparent plastic film substrates is roughened by an appropriate process such as sand blasting, roll embossing and chemical etching so as to have fine irregularities, or a hard coat layer containing dispersed fine particles is additionally provided on the surface of a transparent plastic film substrate to form fine irregularities.

An antiglare hard-coated film having an antiglare-treated transparent plastic film substrate is generally obtained by forming, on a transparent plastic film substrate, a thin coating film with a thickness of about 2 to 10 μm comprising a thermosetting resin or a ionizing radiation-curable resin such as an ultraviolet-curable resin and spherical or indefinite form inorganic or organic fine particles with particle sizes of several μm dispersed in the resin.

As flat panel displays such as LCDs have been used for home television sets, there have been demands for improved display qualities such as wide viewing angle, high response speed and high definition and demands for improved antiglare properties for preventing reflection of a room fluorescent light or the figure of a viewer on the surface of a display and for a further improvement in display contrast at a bright place, namely an improvement in the density of the displayed black.

However, there is a trade-off relationship between antiglare properties and display contrast. In display contrast-oriented applications, therefore, a hard coat layer with a smooth surface is placed on the uppermost surface of a display screen at the expense of antiglare properties. In antiglare properties-oriented applications, an irregular hard coat layer (an antiglare layer) is placed on the uppermost surface of a display screen.

The reflection from the smooth surface of a hard coat layer or from the surface of an antiglare layer and the effect of light scattering in the interior of an antiglare layer are believed to be causes of a reduction in display contrast at a bright place. An antireflection layer for preventing a surface reflection-induced reduction in display contrast may be appropriately provided on the uppermost surface of a display screen so that the reflection of external light from the display screen can be reduced, and thus display contrast at a bright place can be improved.

The trade-off relationship cannot be avoided even when an antiglare hard coat layer obtained by adding fine particles to a hard coat resin is simply used. This is because display contrast can be reduced when the amount of the addition of the fine particles is controlled as needed in order to achieve the desired antiglare properties. For example, Patent Literature 1 shown below discloses a method for solving the problem about the display contrast reduction in such an antiglare hard-coated film.

Patent Literature 1 discloses an antiglare antireflection film including a transparent support and at least one antiglare hard coat layer provided thereon. The antiglare hard coat layer includes at least one type of first optically-transparent particles having an average particle size of at least 60% and less than 95% of the thickness of the antiglare hard coat layer and at least one type of second optically-transparent particles having an average particle size of at least 105% and less than 140% of the layer thickness. In the antiglare antireflection film with such a structure, however, it is difficult to improve both of the display contrast and antiglare properties at the same time only by means of the average particle sizes of the optically-transparent fine particles specified relative to the thickness of the hard coat layer.

Patent Literature 1: Japanese Patent Application Laid-Open No. 2003-248110

DISCLOSURE OF INVENTION

Problems to be Solved by the Invention

The invention has been made in view of the above problems, and it is an object of the invention to provide an antiglare hard-coated film that can maintain antiglare properties and suppress a reduction in the display contrast of a display, when composed of a film substrate and an antiglare hard coat layer formed thereon. It is another object of the invention to provide a polarizing plate comprising such an antiglare hard-coated film and to provide an image display therewith.

Means for Solving the Problems

In order to solve the conventional problems, the inventors have made investigations on antiglare hard-coated films, polarizing plates therewith, and image displays therewith. As a result, the inventors have found that the above objects can be achieved using the features described below and thus have completed the invention.

In order to solve the above problems, the invention is directed to a hard-coated antiglare film, comprising:
a transparent film substrate;
a hard coat layer that is provided on at least one side of the transparent film substrate, contains fine particles and has an irregular surface, wherein
the fine particles have an average particle size of 6 μm to 15 μm,
the fine particles form irregularities with an average slope angle $\theta a$ of 0.4° to 1.5°, and
the hard-coated film produces a display contrast characteristic of 60 or more.

If the average particle size of the fine particles is set in the range of 6 μm to 15 μm, the surface of the antiglare hard-coated film can have a very smooth irregular shape. If the average slope angle $\theta a$ of the irregular shape is from 0.4° to 1.5°, good antiglare properties can be provided. If the display contrast characteristic is 60 or more, good display quality can be provided at a bright place. According to the above features, there can be provided an antiglare hard-coated film exhibiting both improved antiglare properties and improved display contrast. The display contrast characteristic is a value calculated according to the formula: {(the contrast ratio of the antiglare hard-coated film)/(the contrast ratio of a hard-coated film)}×100. The contrast ratio is a value represented by the formula: (the brightness of displayed white/the brightness of displayed black).

In the antiglare hard-coated film, the hard coat layer preferably has a thickness of 15 µm to 35 µm. If the hard coat layer has a thickness of 15 µm or more, an excessive reduction in the hardness of the antiglare hard-coated film itself can be prevented. On the other hand, if the thickness is 35 µm or less, cracking of the antiglare hard-coated film can be prevented. In addition, curling can be prevented, which would otherwise be caused by hardening and shrinkage of the antiglare hard-coated film in such a manner that the antiglare hard-coated film can be curled with the hard coat layer side placed inside.

It is also preferred that the fine particles in the antiglare hard-coated film should be spherical.

In order to solve the above problems, the invention is also directed to a polarizing plate including the hard-coated antiglare film.

Thus, there can be provided a polarizing plate exhibiting good antiglare properties and good display contrast.

In order to solve the above problems, the invention is also directed to an image display including the hard-coated antiglare film or the polarizing plate.

Thus, there can be provided an image display having good antiglare properties, good display contrast and high display quality.

Effects of the Invention

The invention with the above means can provide the following advantages.

According to the invention, the average particle size of the fine particles is set in the range of 6 µm to 15 µm, and the average slope angle θa of the irregular shape of the hard coat layer is set in the range of 0.4° to 1.5°, and the display contrast characteristic is set at 60 or more, so that there can be provided an antiglare hard-coated film excellent in both of the antiglare properties and the display contrast and that there can be provided a polarizing plate comprising such an antiglare hard-coated film and there can be provided an image display comprising such an antiglare hard-coated film or polarizing plate.

DESCRIPTION OF REFERENCE MARKS

| | |
|---|---|
| 1 | film substrate |
| 2 | hard coat layer |
| 2a | resin binder |
| 2b | fine particles |
| 4 | antiglare hard-coated film |
| 5 | antireflection layer |
| 6 | antiglare antireflection hard-coated film |

BEST MODE FOR CARRYING OUT THE INVENTION

Figure 1:
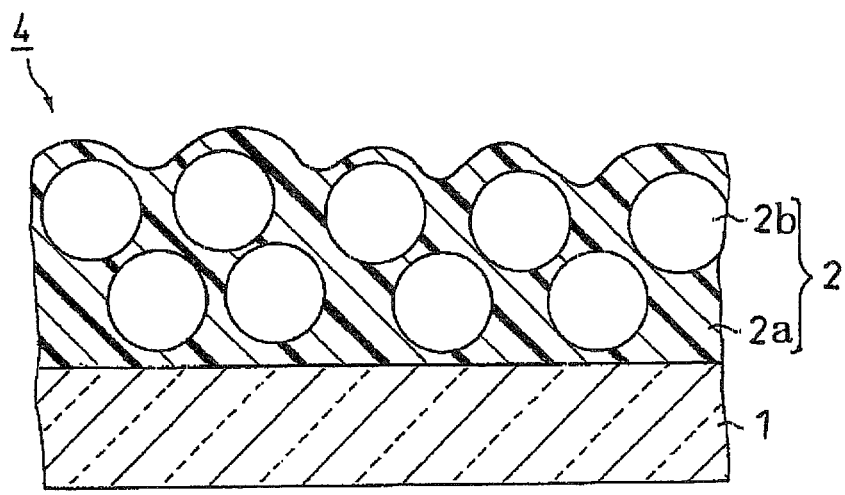
FIG. 1 is a schematic cross-sectional view showing the outline of an antiglare hard-coated film according to one embodiment of the invention.

Some embodiments of the invention are described below with reference to the drawings. FIG. 1 is a crass-sectional view schematically showing a hard-coated antiglare film according to an embodiment of the invention.

As shown in the drawing, the antiglare hard-coated film 4 according to this embodiment is configured to include a film substrate 1 made of a transparent plastic and an antiglare hard coat layer 2 (hereinafter simply referred to as "hard coat layer") laminated on one side of the film substrate 1. The hard coat layer 2 may be provided on both sides of the film substrate 1, although such a structure is not shown in the drawing. While FIG. 1 shows a case where the hard coat layer 2 is a single layer, the hard coat layer may be composed of two or more layers as long as the hard coat layer is provided according to the invention.

The film substrate 1 may be any material that has high visible-light transmittance (preferably a light transmittance of at least 90%) and good transparency (preferably a haze value of at most 1%). As examples of the transparent polymer forming of the above-mentioned transparent substrate film, for example, polyester type polymers, such as polyethylene terephthalate and polyethylenenaphthalate; cellulose type polymers, such as diacetyl cellulose and triacetyl cellulose; polycarbonate type polymer; acrylics type polymer, such as poly methylmethacrylate may be mentioned. And as the polymer forming transparent substrate, styrene type polymers, such as polystyrene and acrylonitrile-styrene copolymer; olefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially in optical property, a film having small birefringence is suitably used.

The hard-coated antiglare film 4 according to the embodiment may be used as a protective film for a polarizing plate. In such a case, the film substrate 1 is preferably made of triacetyl cellulose, polycarbonate, an acrylic polymer, or a polyolefin having a cyclic or norbornene structure. The film substrate 1 may also be a polarizer itself as described later. Such a structure does not need a protective layer of TAC or the like and provides a simple polarizing plate structure and thus allows a reduction in manufacturing steps and an increase in production efficiency. In addition, thinner polarizing plates can also be provided. When the film substrate 1 is a polarizer, the hard-coating layer 2 serves as a protective layer in a conventional manner. The hard-coated film also functions as a cover plate, when attached to the surface of a liquid crystal cell.

A thickness of the film substrate 1 is determined appropriately, and in general, it is approximately 10 to 500 µm so that it may have suitable thinness, or in viewpoint of workability, such as strength and handling property. Especially it is preferably 20 to 300 µm, and more preferably 30 to 200 µm. While the film substrate 1 may have any refractive index, it generally has a refractive index of about 1.30 to about 1.80, particularly preferably of 1.40 to 1.70.

The hard coat layer 2 has an irregular surface part that is formed by adding fine particles 2b to a resin binder 2a.

The hard-coating layer 2 is made from a hard-coating material comprising (A) a urethane acrylate (A), a polyol (meth)acrylate (B) and a (meth)acrylic polymer (C) having an alkyl group containing at least two hydroxyl groups.

The urethane acrylate (A) may comprise components derived from (meth)acrylic acid and/or its ester, a polyol, and a diisocyanate. For example, the urethane acrylate is prepared by a process including the steps of making a hydroxy(meth) acrylate having at least one hydroxyl group from (meth) acrylic acid and/or its ester and a polyol and allowing the hydroxy(meth)acrylate to react with a diisocyanate. The term "(meth)acrylic acid" means acrylic acid and/or methacrylic acid, and "(meth)" has the same meaning with respect to the invention. Each of these components may be of a single type or a combination of two or more types.

Examples of esters of (meth)acrylic acid include alkyl (meth)acrylates such as methyl (meth)acrylate, ethyl (meth) acrylate, propyl (meth)acrylate, isopropyl (meth)acrylate, and butyl (meth)acrylate; and cycloalkyl (meth)acrylates such as cyclohexyl (meth)acrylate.

The polyol is a compound having at least two hydroxyl groups. Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decaneglycol, 2,2,4-trimethyl-1,3-pentanediol, 3-methyl-1,5-pentanediol, neopentylglycol hydroxypivalate ester, cyclohexane dimethylol, 1,4-cyclohexanediol, spiroglycol, tricyclodecane methylol, hydrogenated bisphenol A, ethylene oxide-added bisphenol A, propylene oxide-added bisphenol A, trimethylolethane, tri(di)methylolpropane, glycerin, 3-methylpentane-1,3,5-triol, pentaerythritol, dipentaerythritol, tripentaerythritol, and glucoses.

The diisocyanate may be any type of aromatic, aliphatic or alicyclic diisocyanate. Examples of the diisocyanate include tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethyl hexamethylene diisocyanate, 4,4-diphenylmethane diisocyanate, and hydrogenated derivatives thereof.

Too small addition amounts of the urethane acrylate (A) lead to a reduction in flexibility or adhesion of the resulting hard-coating layer, while too large addition amounts thereof lead to a reduction in hardness of the hard-coating layer after curing. In all the resin components of the hard-coating material (the total amount of Components A, B and C and optionally an additional resin material(s) and the like), therefore, the content of the urethane acrylate (A) is preferably from 15% by weight to 55% by weight, more preferably from 25% by weight to 45% by weight. If the content of the urethane acrylate (A) in all the resin components of the hard-coating material is more than 55% by weight, the hard coating performance can be degraded in some unfavorable cases. If the content is less than 15% by weight, flexibility or adhesion cannot be improved in some unfavorable cases.

Examples of the component of the polyol (meth)acrylate (B) include pentaerythritol di(meth)acrylate, pentaerythritol tri(meth)acrylate, pentaerythritol tetra(meth)acrylate, dipentaerythritol hexa(meth)acrylate, and 1,6-hexanediol (meth) acrylate. A particularly preferred polyol (meth)acrylate contains a monomer component comprising a polymer of pentaerythritol triacrylate and pentaerythritol tetraacrylate. A component mixture containing pentaerythritol triacrylate and pentaerythritol tetraacrylate is also particularly preferred.

Based on the amount of the urethane acrylate (A), the blending amount of the polyol (meth)acrylate (B) is preferably from 70% by weight to 180% by weight, more preferably from 100% by weight to 150% by weight. If the blending amount of the polyol (meth)acrylate (B) is more than 180% by weight based on the amount of the urethane acrylate (A), hardening and shrinking of the hard-coating layer can be significant so that the hard-coated film can significantly curl or its flexibility can be reduced in some unfavorable cases. If the amount is less than 70% by weight, the hard coating properties such as hardness and scratch resistance can be degraded in some unfavorable cases. Practically, the scratch resistance value should preferably in the range of 0 to 0.7, more preferably in the range of 0 to 0.5. If the blending amount of the polyol (meth)acrylate (B) is within the above range, the scratch resistance value can be set within the stated range. How to calculate the scratch resistance value will be described later in the section of Examples.

The alkyl group of the C component is preferably, but not limited to, an alkyl group of 1 to 10 carbon atoms. The alkyl group may be linear or branched. For example, the C component may be a polymer or copolymer including a repeating unit represented by Formula (1) below, or a mixture of the polymer and the copolymer. More specifically, the C component may be a polymer or copolymer of 2,3-dihydroxypropyl (meth)acrylate, 2-hydroxy-3-acryloyloxypropyl (meth)acrylate, 2-acryloyloxy-3-hydroxypropyl (meth)acrylate, 2,3-diacryloyloxypropyl (meth)acrylate, 2-hydroxyethyl (meth) acrylate, 2-acryloyloxyethyl (meth)acrylate, or any other monomer, or a mixture of the polymer and the copolymer.

Formula 1

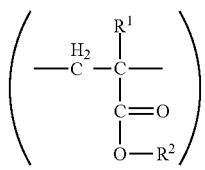

(1)

In formula (1), $R^1$ represents H or $CH_3$, and $R^2$ represents $CH_2CH_2x$ or a functional group represented by formula (2) below.

Formula 2

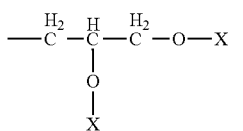
(2)

X represents H or an acryloyl group represented by formula (3) below, and the respective X groups may be the same or different.

Formula 3

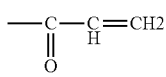
(3)

The amount of the addition of the C component is preferably from 25% by weight to 110% by weight, more preferably from 45% by weight to 85% by weight, based on the amount of the urethane acrylate (A component). If the amount of the addition is more than 110% by weight, the coatability can be reduced, which is unfavorable in some cases. If the amount of the addition is less than 25% by weight, the occurrence of curling can significantly increase, which is unfavorable in some cases.

According to the invention, the addition of the (meth) acrylic polymer (C) allows suppression of hardening and shrinking of the hard-coating layer 2 and thus leads to the prevention of curling. In view of the production of the hard-coated film and the like, curling should preferably be controlled within 30 mm or less. If curling is controlled within such a range, workability and production efficiency can be further improved.

The hard-coating layer 2 contains fine particles 3, which mainly function as antiglare fine particles to impart antiglare properties. The fine particles 3 may be classified into inorganic and organic fine particles. The inorganic fine particles may be made of any material such as silicon oxide, titanium oxide, aluminum oxide, zinc oxide, tin oxide, calcium carbonate, barium sulfate, talc, kaolin, and calcium sulfate. The organic fine particles may also be any material such as polymethyl methacrylate acrylate resin powder, silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, and polyethylene fluoride resin powder. Two or more of these types of inorganic and organic fine particles may be used at the same time.

The average particle size of the fine particles 3 is from 30% to 75% of the thickness of the hard-coating layer 2, more preferably from 30% to 50% of the thickness. If the average particle size is less than 30% of the thickness, sufficient unevenness cannot be formed on the surface, so that disadvantageously, sufficient antiglare function cannot be provided. On the other hand, if the average particle size is more than 75% of the thickness, the steps of the surface unevenness can be so large that disadvantageously, the appearance can be degraded or reflected light can be strongly scattered to produce white blurring.

The blending amount of the fine particles 3 may be set at any appropriate value without any particular limitation. Specifically, based on 100 parts by weight of the hard-coating material, the amount of the fine particles 3 is preferably from 2 to 70 parts by weight, more preferably from 4 to 50 parts by weight, particularly preferably from 15 to 40 parts by weight.

While the refractive index of the fine particles 2b should be appropriately selected in view of its relationship with the refractive index of the binder component 2a of the hard coat layer 2, it is preferred that the refractive index of the fine particles 2b should appropriately selected in the range of 1.40 to 0.170. In order to reduce, as much as possible, light scattering at the interface between the binder resin 2a and the fine particles 2b, it is necessary to reduce the difference between the refractive indices of the resin binder 2a and the fine particles 2b. In general, the resin binder 2a has a refractive index of 1.5 to 1.6. Therefore, the fine particles 2b are preferably fine particles of an organic or inorganic material having a refractive index close to that of the organic resin binder 2a, such as silicon oxide and the like. The difference of the refractive index of the fine particles 2b from that of the hard coat layer 2 is preferably less than 0.05. If the refractive index difference is 0.05 or more, light scattering can be strong so that some problems such as unclearly displayed images and a reduction in display contrast can be produced. The difference of the refractive index of the fine particles 2b from that of the hard coat layer is more preferably less than 0.03, particularly preferably less than 0.02.

The fine particles 2b have an average particle size in the range of 6 μm to 15 μm. If the average particle size is less than 6 μm, display contrast at a bright place will tend to decrease even when the surface shape of the hard coat layer 2 satisfies the value of the average slope angle θa described later, although the reason is unclear. If the average particle size is more than 15 μm, the size of the fine particles 2b will be relatively large as compared with the thickness of the hard coat layer 2, so that it can be difficult to control the degree of burying of the fine particles 2b into the hard coat layer 2, and thus overlap of the fine particles 2b and so on occur so that the fine particles 2b can protrude from the surface of the hard coat layer 2 to form projection defects. When a hard coat layer with a flat surface shape is used and placed at the screen of a display, the value of the display contrast measured at a bright place can be generally highest, although display screen glare is generated (except when an antireflection layer is formed on the hard coat layer). On the other hand, when the hard coat layer 2 containing the fine particles 2b with an average particle size of 6 μm to 15 μm is used, the value of the display contrast at a bright place is lower than that in the case of the above hard coat layer but can be prevented from being significantly reduced.

Substantially spherical particles with aspect ratios of 1.5 or less are preferably used as the fine particles 2b, and truly spherical fine particles are more preferably used. If spherical or polyhedral fine particles with an aspect ratio of more than 1.5 are used, it can be sometimes difficult to control the θa value of the irregular shape formed with the fine particles.

The average tilt angle θa of the hard-coating layer 2 needs to be from 0.4° to 1.5°. If θa is less than 0.4°, sufficient antiglare properties cannot be produced, and outside light or the like can disadvantageously cause glare. On the other hand, if θa is more than 1.5°, the haze value can disadvantageously increase. Within the above range, the hard-coating layer 2 can provide an improved antiglare effect and appropriately block outside light or like from glare. The average tilt angle θa is a value obtained by the method according to JIS B 0601.

In the invention, the average slope angle θa is a value defined by mathematical expression (1):

Expression 1

$$\theta a = \tan^{-1} \Delta a \quad (1)$$

Figure 2:
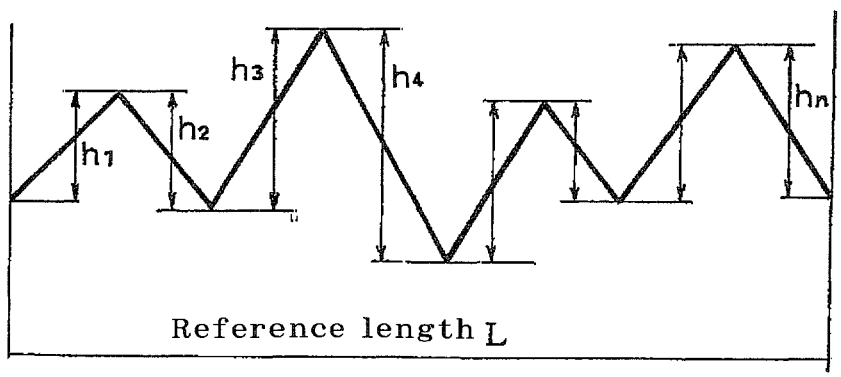
FIG. 2 is a schematic diagram for describing a method for measuring the average slope angle θa of the irregular shape of the surface of the antiglare hard-coated film.

In mathematical expression (1), Δa is according to mathematical expression (2) below and is a value obtained by dividing the total of differences (the height h) between adjacent pairs of peak and bottom with respect to the reference length L of a roughness curve according to JIS B 0601 (1994) (the total of heights $(h_1+h_2+h_3+\ldots h_n)$) by the reference length L. The roughness curve is obtained by removing a surface waviness component longer than a given wavelength from a cross-section curve with a retardation-compensating broad-band filter. The cross-section curve corresponds to the contour of a section formed by cutting an object with a plane perpendicular to the object surface. FIG. 2 shows an example of each of the roughness curve, the height h and the reference length L.

Expression 2

$$\Delta a = (h_1 + h_2 + h_3 + \ldots + h_n)/L \quad (2)$$

The difference (d) between the refractive indexes of the film substrate 1 and the hard-coating layer 2 is preferably at most 0.04, more preferably at most 0.02. When a polyethylene terephthalate film with a refractive index of about 1.64 is used as the film substrate 1, about 35% of titanium oxide ultrafine particles with particle sizes of at most 100 nm in all the resin components of the hard-coating material can control d to 0.02 or less and prevent the occurrence of interference fringes.

The thickness of the hard-coating layer 2 is preferably from 15 to 35 μm, more preferably from 20 to 30 μm. Even at a lower limit of thickness of 15 μm, the hard-coating layer 2 using the polyol (meth)acrylate (B) can retain at least a certain level of hardness (for example, a pencil hardness of at least 4H). Even at an upper limit of thickness of 35 μm for a further increase in hardness, the hard-coating layer 2 using the urethane acrylate (A) and the (meth)acrylic polymer (C) having an alkyl group containing at least two hydroxyl groups can be sufficiently prevented from curling, cracking or the like. If the thickness is less than 15 μm, the hardness of the hard-coating layer can be degraded. On the other hand, a thickness of more than 35 μm can cause a practical problem in which the hard-coating layer itself can be cracked, or the hard-coated film can curl toward the hard-coating surface side due to hardening and shrinking of the hard-coating layer. The thickness is preferably set at 20 μm or more, in order to achieve a hardness of 4H or more in a pencil hardness test according to JIS K 5400.

Various types of solvents may be used as the dilution solvent for the hard-coating material. Examples of such solvents include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone, diethyl ketone, dipropyl ketone, diisobutyl ketone, cyclopentanone, cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone, 2-octanone, 2-pentanone, 2-hexanone, 2-heptanone, and 3-heptanone. One of these solvents or any combination of two or more of these solvents may be used. The content of ethyl acetate in all the dilution solvents is preferably at least 20% by weight, more preferably at least 25% by weight, particularly preferably from 30% by weight to 70% by weight. When triacetyl cellulose is used for the film substrate 1, such a content of ethyl acetate allows the production of a hard-coating layer 2 with particularly high adhesion. If the content of ethyl acetate in all the dilution solvents is more than 70% by weight, the rate of volatilization can be high so that unevenness in coating or drying can easily occur. If the content is less than 20% by weight, the adhesion to the substrate can be degraded in some unfavorable cases.

For example, the surface unevenness of the hard-coating layer 2 may be formed by a process including the step of previously roughening the surface of the film for use in the production of the hard-coating layer 2 by an appropriate method such as sand blasting, roll embossing, and chemical etching to form fine unevenness on the film surface in combination with a process including the step of forming fine unevenness on the surface of the material directly forming the hard-coating layer 2.

Various types of leveling agents may be added to the hard-coating material. The leveling agent may be appropriately a fluorochemical or silicone leveling agent, more preferably a silicone leveling agent such as a reactive silicone, polydimethylsiloxane, polyether-modified polydimethylsiloxane, and polymethylalkylsiloxane. Among these silicone leveling agents, the reactive silicone is particularly preferred. The reactive silicone added can impart lubricity to the surface and produce continuous scratch resistance. When a low refractive index layer containing a siloxane component is used, a hydroxyl-containing reactive silicone can increase adhesion.

For example, the reactive silicone leveling agent may be a compound having a siloxane bond and an acrylate group and a hydroxyl group. Specific examples of such a compound include:

(1) copolymers of dimethylsiloxane/methyl, 3-acryloyl-2-hydroxypropoxypropylsiloxane/methyl, and 2-acryloyl-3-hydroxypropoxypropylsiloxane (0.8:0.16:0.04 in molar ratio);

(2) copolymers of dimethylsiloxane, hydroxypropylsiloxane, (6-isocyanate-hexyl)isocyanuric acid, and aliphatic polyester (6.3:1.0:2.2:1.0 in molar ratio); and (3) copolymers of dimethylsiloxane, acrylate-terminated methyl polyethylene glycol propyl ether siloxane, and hydroxyl-terminated methyl polyethylene glycol propyl ether siloxane (0.88:0.07:0.05 in molar ratio).

The blending amount of the leveling agent is preferably at most 5 parts by weight, more preferably in the range of 0.01 to 5 parts by weight, based on 100 parts by weight of all the resin components of the hard-coating material.

In a case where ultraviolet light is used to cure the hard-coating material, the leveling agent in the hard-coating material can bleed to the air interface during the steps of pre-drying and drying off the solvent so that the effect of inhibiting curing of UV-curable resin by oxygen can be blocked and that a hard-coating layer 2 having sufficient hardness even at the uppermost surface can be obtained. The silicone leveling agent can also bleed to the surface of the hard-coating layer 2 to provide lubricity and thus can increase scratch resistance.

If necessary, the material for forming the hard-coating layer 2 may contain a pigment, a filler, a dispersing agent, a plasticizer, a ultraviolet absorbing agent, a surfactant, an antioxidant, a thixotropy-imparting agent, or the like, as long as the performance is not degraded. One of these additives may be used alone, or two or more of these additives may be used together.

In an embodiment of the invention, the hard-coating material may contain any conventional photopolymerization initiator. Examples of applicable initiators include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N, N,N',N'-tetramethyl-4,4'-diaminobenzophenone, 1-(4-isopropylphenyl)-2-hydroxy-2-methylpropane-1-one, and other thioxanthone compounds.

A process of forming the hard-coating layer 2 includes the steps of applying, to the film substrate 1, the hard-coating material that contains at least the urethane acrylate (A), the polyol (meth)acrylate (B) and the (meth)acrylic polymer (C) having an alkyl group containing at least two hydroxyl groups, and then curing the material. The hard-coating material may be applied in the form of a solvent solution. The applied solution of the hard-coating material is dried and then cured.

The hard-coating material may be applied to the film substrate 1 by any conventional coating method such as fountain coating, die coating, spin coating, spray coating, gravure coating, roll coating, and bar coating.

While the hard-coating material may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably from 50 to 5000 mJ/cm$^2$ in terms of accumulative exposure at an ultraviolet wavelength of 365 nm. If the amount of irradiation is less than 50 mJ/cm$^2$, curing can be insufficient so that the hardness of the hard-coating layer can be degraded in some cases. Beyond 5000 mJ/cm$^2$, the hard-coating layer can be colored and have reduced transparency in some cases.

The antiglare hard-coated film 4 according to this embodiment can produce good display contract properties even without an antireflection layer for reducing surface reflection of light. However, this does not prohibit forming an antiglare antireflection hard-coated film in which an antireflection layer is formed on the antiglare hard-coated film of the invention.

Figure 3:
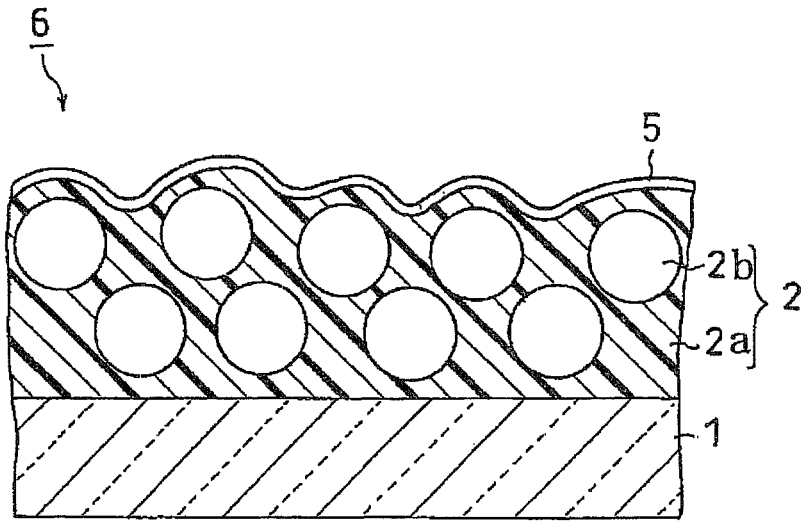
FIG. 3 is a schematic cross-sectional view showing the outline of an antiglare antireflection hard-coated film according to another embodiment of the invention.

FIG. 3 shows an antiglare antireflection hard-coated film having an antireflection layer. Light incident on an object undergoes reflection on the interface, absorption and scattering in the interior and any other phenomena until it goes through the object and reaches the back side. Light reflection at the interface between air and a hard coat layer is one of the factors in the reduction in visibility of the image on a display equipped with the hard-coated film. The antireflection layer 5 reduces such surface reflection. Although not shown in FIG. 3, the hard coat layer 2 and the antireflection layer 5 may be formed on both sides of the film substrate 1. While FIG. 3 illustrates a case where a single hard coat layer 2 and a single antireflection layer 5 are formed, respectively, the antireflection layer 5 may comprise two or more layers as long as the hard coat layer 2 is provided according to the invention.

The antireflection layer 5 may be a thin optical film that is stacked on the surface of the hard-coating layer 2 so as to have strictly controlled thickness and refractive index. In this technique, the antireflection function is produced by allowing opposite phases of incident light and reflected light to cancel each other out based on interference of light.

When the antireflection layer 5 is designed based on interference of light, the interference effect can be enhanced by a method of increasing the difference between the refractive indexes of the antireflection layer 5 and the hard-coating layer 2. A laminate of two to five thin optical films (each with strictly controlled thickness and refractive index) may be stacked on a substrate to form an antireflection multilayer. In such a case, components of different refractive indexes are generally used to form a plurality of layers with a certain thickness. Thus, the antireflection layer 5 can be optically designed at a higher degree of freedom, the antireflection effect can be enhanced, and it may be possible to make the spectral reflection characteristics flat in the visible light range. Since each layer of the thin optical film must be precise in thickness, a dry process such as vacuum deposition, sputtering, and CVD is generally used to form each layer.

The antireflection layer 5 may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 1.8), which is formed on the hard-coating layer, and a low-refractive-index silicon oxide layer (refractive index: about 1.45), which is formed on the titanium oxide layer. Also preferred is a four-layer laminate comprising the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

The antireflection effect can also be produced by stacking a thin monolayer optical film on the film substrate 1. In the design of a single antireflection layer 5, the difference between the refractive indexes of the antireflection layer 5 and the hard-coating layer 2 should be large for the maximum antireflection function. Concerning the thickness (d) of the antireflection layer 5, the refractive index (n) and the wavelength ($\lambda$) of incident light, the relation nd=$\lambda$/4 is established. If the antireflection layer 5 is a low-refractive-index layer having a refractive index lower than that of the film substrate 1, its reflectance can be minimum under the conditions that the relation should be established. For example, if the refractive index of the antireflection layer 5 is 1.45, the antireflection layer 5 with a thickness of 95 nm can have a minimum reflectance at a wavelength of 550 nm with respect to an incident beam of visible light.

The antireflection function should be produced in the visible light wavelength range of 380 to 780 nm, and the visibility is particularly high in the wavelength range of 450 to 650 nm. The layer is generally designed to have a minimum reflectance at the center wavelength 550 nm of the range.

In the design of a single antireflection layer 5, its thickness accuracy may be less strict than that of the antireflection multilayer and may be in the range of the design thickness ±10%. In a case where the design thickness is 95 nm, for example, the layer with a thickness in the range of 86 nm to 105 nm can be used without problems. Thus, a single antireflection layer 5 is generally formed using a wet process such as fountain coating, die coating, spin coating, spray coating, gravure coating, roll coating, and bar coating.

Examples of the material for forming a single antireflection layer 5 include resin materials such as UV-curable acrylic resins; hybrid materials such as a dispersion of inorganic fine particles (such as colloidal silica) in a resin; and sol-gel materials using metal alkoxide such as tetraethoxysilane and titanium tetraethoxide. Any of these materials may be used together with a fluoro-compound for imparting anti-fouling surface properties. In terms of scratch resistance, low-refractive-index layer materials with a high content of an inorganic component tend to provide good performance, and sol-gel materials are particularly preferred. Partial condensates of sol-gel materials may be used.

The sol-gel fluoro-substance may be typically perfluoroalkylalkoxysilane such as a compound represented by the general formula: $CF_3(CF_2)_nCH_2CH_2Si(OR)_3$, wherein R represents an alkyl group of 1 to 5 carbon atoms, and n represents an integer of 0 to 12. Specific examples include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane. In particular, the compounds whose n is from 2 to 6 are preferred.

The low-refractive-index layer (the antireflection layer) is preferably produced with a hard-coating material that contains, as disclosed in JP-A No. 2004-167827, a siloxane oligomer with an ethylene glycol-equivalent number average molecular weight of 500 to 10000 and a fluorine compound having a polystyrene-equivalent number average molecular weight of at least 5000 and having a fluoroalkyl structure and a polysiloxane structure.

The low-refractive-index layer (the antireflection layer) may contain an inorganic sol for increasing film strength. While any inorganic sol material may be used such as silica, alumina, and magnesium fluoride, silica sol is particularly preferred. The amount of the inorganic sol is appropriately set within the range of 10 to 80 parts by weight, based on 100 parts of the total solids of the low-refractive-index-coating material. The particle size of the inorganic sol is preferably in the range of 2 to 50 nm, more preferably of 5 to 30 nm.

The antireflection layer 5 may contain hollow spherical silicon oxide ultrafine particles for the purpose of reducing the refractive index. The material for forming the antireflection layer 5 preferably contains hollow spherical silicon oxide ultrafine particles. The hollow spherical silicon oxide ultrafine particles preferably have an average particle size of 5 to 300 nm. Such ultrafine particles are like hollow spheres each comprising a pore-containing outer shell in which a hollow is formed. The hollow may contain a solvent and/or a gas which are left after the fine particles are prepared. A precursor substance for forming the hollow is preferably left in the hollow. The thickness of the outer shell is preferably in the range of about 1 to about 50 nm and in the range of 1/50 to 1/5 of the average particle size. The outer shell preferably comprises a plurality of coating layers. The pore is preferably blocked, and the hollow is preferably sealed with the outer shell. The antireflection layer 5 holding a porous structure or a hollow can have a reduced refractive index and thus is preferably used.

The silicon oxide ultrafine particles should have an average particle size of about 5 to about 300 nm. If the average particle size is less than 5 nm, the volume fraction of the outer shell in the spherical fine particles can be higher and thus the volume fraction of the hollow can be lower. If the average particle size is more than 300 nm, it may be difficult to prepare a stable dispersion, and the ultrafine particle-containing antireflection layer can tend to have reduced transparency. The hollow spherical silicon oxide ultrafine particles preferably have an average particle size in the range of 10 to 200 nm. The average particle size may be determined by dynamic light scattering.

For example, a method of producing hollow spherical silicon oxide ultrafine particles includes the steps (a) to (c) as described below.

(a) Simultaneously adding an aqueous silicate solution and/or an acidic silicic acid solution and an aqueous solution of an alkali-soluble inorganic compound to an aqueous alkali solution with a pH of 10 or more or an aqueous alkali solution with a pH of 10 or more in which seed particles are optionally dispersed, in order to form a dispersion of core particles with a $MO_x/SiO_2$ molar ratio of 0.3 to 1.0, wherein $SiO_2$ represents silicon oxide, and $MO_x$ represents inorganic compounds other than silicon oxide;

(b) adding a source of silicon oxide to the dispersion of core particles to form a first silicon oxide coating layer on the core particles; and (c) adding an acid to the dispersion so as to partially or entirely remove an element constituting the core particles.

A dispersion of the hollow spherical silicon oxide ultrafine particles may be mixed with any type of matrix component to form an antireflection coating liquid. The term "any type of matrix component" refers to any component capable of forming a coating film on the surface of the hard-coating layer. The matrix may be selected and used from resins and the like satisfying the requirements for adhesion to the substrate, hardness, coating properties, and the like. Examples of such a matrix include conventional organic resins such as polyester resins, acrylic resins, urethane resins, vinyl chloride resins, epoxy resins, melamine resins, fluororesins, silicone resins, butyral resins, phenol resins, vinyl acetate resins, UV-curable resins, electron beam-curable resins, emulsion resins, water-soluble resins, hydrophilic resins, any mixtures thereof, any copolymers thereof, and any modifications thereof. The hydrolyzable organic silicon compounds as illustrated for the single antireflection layer 5 may also be used as the matrix component.

When the organic resin is used as the matrix component, for example, the matrix and an organic solvent dispersion of hollow spherical silicon oxide ultrafine particles, which uses an organic solvent such as an alcohol in place of water as a dispersion medium, or the matrix and an organic solvent dispersion of the ultrafine particles which has been optionally treated with any conventional coupling agent are diluted with any appropriate organic solvent to form an antireflection coating liquid.

When the hydrolyzable organic silicon compound is used as the matrix component, for example, water and a catalyst of an acid or alkali are added to a liquid mixture of an alkoxysilane and an alcohol to form a partially hydrolyzed product of the alkoxysilane, which is then mixed with the above-mentioned dispersion and optionally diluted with an organic solvent to form a coating liquid.

In the coating liquid, the weight ratio of the silicon oxide ultrafine particles to the matrix component is preferably in the range of 1:99 to 9:1. If the weight ratio exceeds 9:1, the antireflection layer can be insufficient in strength and impractical in some cases. If the weight ratio is less than 1:99, the addition of the silicon oxide ultrafine particles cannot be so effective in some cases.

The refractive index of the antireflection layer 5 formed on the surface of the hard-coating layer 2 may be as low as from 1.2 to 1.42 depending on the mixture ratio between the silicon oxide ultrafine particles and the matrix component or the like and the refractive index of the matrix used. The refractive index of the silicon oxide ultrafine particles themselves may be from 1.2 to 1.38 in the invention.

The hard-coated antireflection film having the antireflection layer 5 formed on the hard-coating layer 2 of the hard-coated film is preferred in terms of pencil hardness. The surface of the ultrafine particle-containing hard-coating layer 2 has fine unevenness, which may have an effect on pencil drawing (the pencil can tend to scratch the surface, and the force can tend to be exerted). If the antireflection layer 5 is provided, the unevenness can be smoothed out, and the pencil hardness of the hard-coating layer can be increased from a usual value (such as about 3H) to 4H.

For example, the hollow spherical silicon oxide ultrafine particles are preferably prepared using the method of producing silica fine particles as disclosed in JP-A No. 2000-233611.

In the process of forming the low-refractive-index layer, while drying and curing may be performed at any temperature, they are generally performed at a temperature of 60 to 150° C., preferably of 70 to 130° C., generally for a time period of 1 minute to 30 minutes, more preferably of about 1 minute to about 10 minutes in view of productivity. After drying and curing, the layer may be further heated so that a hard-coated antireflection film of high hardness can be obtained. While the heating may be performed at any temperature, it is generally performed at a temperature of 40 to 130° C., preferably of 50 to 100° C., generally for a time period of 1 minute to 100 hours, more preferably of at least 10 hours in terms of further increasing scratch resistance. The temperature and the time period are not limited to the above range and may be adjusted as needed. The heating is appropriately performed by a method using a hot plate, an oven, a belt furnace, or the like.

The antireflection layer 5 may be more frequently attached to the uppermost surface of image displays and thus tends to receive stains from the external environment. Particularly, general stains such as fingerprint, thumbmark, sweat, and hair dressing are frequently left. The stain deposit can change the surface reflectance or stand out whitely to make the displayed content unclear. Such stains can be more noticeable on the layer than on a simple transparent plate or the like. In such a case, a fluoro-silane compound, a fluoro-organic compound or the like may be layered on the antireflection layer 5 in order to impart the function of anti-deposition or easy elimination.

Any type of surface treatment may be performed on the film substrate 1 or the hard-coating layer 2 formed on the film substrate 1 so as to increase the adhesion between the film substrate 1 and the hard-coating layer 2 or between the film substrate 1, the polarizer or the hard-coating layer 2, and the antireflection layer 5. The surface treatment may be low-pressure plasma treatment, ultraviolet radiation treatment, corona treatment, flame treatment, or acid or alkali treatment. When triacetyl cellulose is used for the film substrate, alkali saponification treatment as specifically described below is preferably used. The surface of the cellulose ester film is preferably subjected to cycles of immersing in an alkali solution and then washing with water and drying. The alkali solution may be a potassium hydroxide solution or a sodium hydroxide solution, and the normal concentration of the hydroxide ion is preferably from 0.1 N to 3.0 N, more preferably from 0.5 N to 2.0 N. The temperature of the alkali solution is preferably in the range of 25° C. to 90° C., more preferably of 40° C. to 70° C. Thereafter, washing with water and drying are performed so that surface-treated triacetyl cellulose can be obtained.

For the purpose of preventing curling, the back surface of the film substrate 1 (the surface opposite to the surface on which the hard-coating layer 2 is formed) may be subjected to the solvent treatment as described below. The solvent treatment includes the step of applying, by any conventional method, a composition containing a solvent capable of dissolving or swelling the film substrate 1. If such a solvent is applied, the film substrate 1 can have a tendency to curl toward the back side, which can cancel the force allowing the film substrate 1 with the hard-coating layer 2 to curl toward the hard-coating layer 2 side and thus prevent curling.

The solvent may be a dissolving solvent and/or a swelling solvent or a mixture thereof, and the solvent may further contain a solvent incapable of dissolving the substrate. A composition thereof with an appropriate mixture ratio is applied in an appropriate amount depending on the degree of curling of the film substrate 1 and the type of the resin.

In order to enhance the function of preventing curling, the content of the solvent capable of dissolving and/or swelling in the mixture composition can be effectively increased, and that of the solvent incapable of dissolving can be effectively decreased. The mixture ratio of the solvent capable of dissolving and/or swelling to the solvent incapable of dissolving is preferably from 10:0 to 1:9. Examples of the solvent capable of dissolving or swelling transparent resin films for such a mixture composition include benzene, toluene, xylene, dioxane, acetone, methyl ethyl ketone, N,N-dimethylformamide, methyl acetate, ethyl acetate, trichloroethylene, methylene chloride, ethylene chloride, tetrachloroethane, trichloroethane, and chloroform. Examples of the solvent incapable of dissolving include methanol, ethanol, n-propyl alcohol, isopropyl alcohol, and n-butanol.

The solvent composition may be applied onto the surface of the film substrate 1 with a gravure coater, a dip coater, a reverse coater, or an extrusion coater so as to provide a wet film thickness (a film thickness before drying) of 1 to 100 μm, more preferably of 5 to 30 μm.

Each solvent applied in such a manner may be dispersed out after drying, or a very small amount of each solvent may remain. In a preferred mode, however, no solvent remain on the applied surface.

In order to prevent curling, the transparent resin layer as described below may also be formed on the back surface of the film substrate 1 (the surface opposite to the surface on which the hard-coating layer 2 is formed). For example, the transparent resin layer is mainly composed of a thermoplastic resin, a radiation-curable resin, a thermosetting resin, or any other reactive resin. In particular, the layer mainly composed of a thermoplastic resin is preferred.

Examples of the thermoplastic resin include vinyl polymers or copolymers such as vinyl chloride-vinyl acetate copolymers, vinyl chloride resins, vinyl acetate resins, vinyl acetate-vinyl alcohol copolymers, partially hydrolyzed vinyl chloride-vinyl acetate copolymers, vinyl chloride-vinylidene chloride copolymers, vinyl chloride-acrylonitrile copolymers, ethylene-vinyl alcohol copolymers, chlorinated polyvinyl chloride, ethylene-vinyl chloride copolymers, and ethylene-vinyl acetate copolymers; cellulose derivatives such as nitrocellulose, cellulose acetate propionate, and cellulose acetate butyrate resins; copolymers of maleic acid and/or acrylic acid, acrylate ester copolymers, acrylonitrile-styrene copolymers, chlorinated polyethylene, acrylonitrile-chlorinated polyethylene-styrene copolymers, methyl methacrylate-butadiene-styrene copolymers, acrylic resins, polyvinyl acetal resins, polyvinyl butyral resins, polyester polyurethane resins, polyether polyurethane resins, polycarbonate polyurethane resins, polyester resins, polyether resins, polyamide resins, amino resins, rubber resins such as styrene-butadiene reins and butadiene-acrylonitrile resins, silicone resins, and fluororesins. Among these thermoplastic resins, cellulose resins such as diacetyl cellulose are particularly preferably used for the transparent resin layer.

The film substrate 1 side of the hard-coated antiglare film 4 or the hard-coated antireflection antiglare film 6 is generally bonded to an optical component for use in a LCD or ELD via a pressure-sensitive adhesive or an adhesive. Before the bonding, the film substrate 1 may also be subjected to the surface treatment as described above.

For example, the optical component is a polarizer or a polarizing plate. A polarizing plate comprising a polarizer and a transparent protective film formed on one or both sides of the polarizer is commonly used. If the transparent protective film is formed on both sides of the polarizer, the front and rear transparent protective films may be made of the same material or different materials. Polarizing plates are generally placed on both sides of a liquid crystal cell. Polarizing plates may be arranged such that the absorption axes of two polarizing plates are substantially perpendicular to each other.

Referring to an example of the polarizing plate, a description is then provided of an optical device in which the hard-coated film or hard-coated antireflection film of the invention is stacked. The hard-coated antiglare film 4 or hard-coated antireflection antiglare film 6 of the invention and a polarizer or polarizing plate may be laminated with an adhesive or a pressure-sensitive adhesive to form a polarizing plate having the function according to the invention. The polarizing plate is generally placed on both sides of a liquid crystal cell. In general, two polarizing plates are placed such that their absorption axes are substantially orthogonal to each other. A polarizing plate generally used includes a polarizer and a transparent protective film provided on one or both sides of the polarizer. When the transparent protective film is provided on both sides of the polarizer, the front and rear transparent protective films may be made of the same material or different materials.

The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed.

By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

The transparent protective film formed on one or both sides of the polarizer preferably has good transparency, mechanical strength, thermal stability, moisture-blocking properties, retardation value stability, or the like. Examples of the material for the transparent protective film include polyester resins such as polyethylene terephthalate and polyethylene naphthalate; cellulose resins such as diacetyl cellulose and triacetyl cellulose; acrylic resins such as poly(methyl methacrylate); styrene-based resins such as polystyrene, acrylonitrile-styrene copolymers, styrene resins, acrylonitrile-styrene resins, acrylonitrile-butadiene-styrene resins, acrylonitrile-ethylene-styrene resins, styrene-maleimide copolymers, and styrene-maleic anhydride copolymers; and polycarbonate resins. The transparent protective film may be a polymeric film made of a polyolefin resin such as a cycloolefin resin, a norbornene resin, polyethylene, polypropylene, and an ethylene-propylene copolymer, a vinyl chloride resin, an amide resin such as nylon and aromatic polyamide, an imide resin such as aromatic polyimide and polyimide amide, a sulfone resin, a polyethersulfone resin, a polyetheretherketone resin, a polyphenylene sulfide rein, a vinyl alcohol resin, a vinylidene chloride resin, a vinyl butyral resin, an allylate resin, a polyoxymethylene resin, an epoxy resin, or any blend of the above resins. The transparent protective film may also be formed by curing a layer of a thermosetting or UV-curable resin such as an acrylic resin, a urethane resin, an acrylic urethane resin, an epoxy resin, and a silicone resin.

Moreover, as is described in Japanese Patent Laid-Open Publication No. 2001-343529 (WO 01/37007), polymer films, for example, resin compositions including (A) thermoplastic resins having substituted and/or non-substituted imide group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. These films exhibit small retardations and small photoelastic coefficients and thus can eliminate defects such as unevenness due to distortion when used in a protective film for a polarizing plate or the like. These films also have low moisture permeability and thus have high durability against moistening.

In terms of polarizing properties, durability and the like, cellulose resins such as triacetyl cellulose and norbornene resins are preferably used for the transparent protective film. Specific examples of such resins include FUJITAC (trade name) manufactured by Fuji Photo Film Co., Ltd., ZEONOA (trade name) manufactured by Nippon Zeon Co., Ltd. and ARTON (trade name) manufactured by JSR Corporation.

A thickness of the transparent protective film is determined appropriately, and in general, it is approximately 1 to 500 μm so that it may have suitable thinness, or in viewpoint of workability, such as strength and handling property. Especially it is preferably 5 to 200 μm, and more preferably 10 to 150 μm. In the above range, the transparent protective film can mechanically protect a polarizer and can prevent a polarizer from shrinking and retain stable optical properties even when exposed to high temperature and high humidity.

It is preferred that the degree of the coloration of the transparent substrate film is as little as possible. Accordingly, it is preferred to use a protective film wherein a phase difference value in the film thickness direction, which is represented by $Rth=(nx-nz) \cdot d$ wherein nx represent refractive indexes of the film of the slow axis direction in its plane, nz represents a refractive index of the film in the thickness direction thereof, and d represents a thickness of the film, is from −90 to +75 nm. The use of the film wherein the phase difference value (Rth) in the thickness direction is from −90 nm to +75 nm makes it possible to overcome substantially the coloration (optical coloration) of the polarizing plate, resulting from the protective film. The phase difference value (Rth) in the thickness direction is more preferably from −80 nm to +60 nm, more preferably from −70 nm to +45 nm.

The in-plane retardation value of the transparent protective film and the retardation value in the thickness direction of the transparent protective film can affect the viewing angle properties of liquid crystal displays. Thus, it is preferable to use a transparent protective film with an optimized retardation value. It should be noted that the transparent protective film stacked on a polarizer surface close to a liquid crystal cell should have an optimized retardation value, while that stacked on a polarizer surface far away from the liquid crystal cell does not affect the optical properties of the liquid crystal display and thus does not need to have an optimized retardation value.

The transparent protective film stacked on a polarizer surface close to a liquid crystal cell preferably has an in-plane retardation value (Re:(nx−ny)·d) of 0 to 5 nm, more preferably of 0 to 3 nm, still more preferably of 0 to 1 nm. Its retardation value in its thickness direction (Rth) is preferably from 0 to 15 nm, more preferably from 0 to 12 nm, still more preferably from 0 to 10 nm, particularly preferably from 0 to 5 nm, most preferably from 0 to 3 nm.

The polarizing plate in which the hard-coated film 4 or the like is stacked may be a laminate of the hard-coated film or the like, the transparent protective film, the polarizer, and the transparent protective film in this order or a laminate of the hard-coated film or the like, the polarizer and the transparent protective film in this order.

In addition, the transparent protective film surface to which the polarizer is not bonded may be provided with a hard-coating layer or subjected to anti-sticking treatment. The hard-coating treatment is performed in order to prevent scratching of the polarizing plate surface. In the process of forming the hard-coating layer, for example, a cured film with high hardness, good sliding characteristics and the like may be formed on the surface of the transparent protective film by using an appropriate UV-curable resin such as an acrylic resin and a silicone resin. The anti-sticking treatment is performed in order to prevent adhesion to the adjacent layer. The hard-coating layer, the anti-sticking layer or the like may be formed as being the transparent protective film itself or may be provided as an independent optical layer separately from the transparent protective film.

A hard-coating layer, a primer layer, an adhesive layer, a pressure-sensitive adhesive layer, an antistatic layer, an electrically-conductive layer, a gas barrier layer, a water vapor-blocking layer, a moisture-blocking layer, or the like may also be placed between the layers of a polarizing plate or on the surface of a polarizing plate. At the stage of forming each layer of the polarizing plate, electrically-conductive particles, an antistatic agent, various types of fine particles, a plasticizer, or the like may also be added to or mixed with the material for each layer to modify it as needed.

Any method may be used to laminate the transparent protective film and the polarizer. For example, the protective film and the polarizer may be laminated through an adhesive comprising an acrylic polymer or a vinyl alcohol polymer or an adhesive comprising at least a water-soluble crosslinking agent for a vinyl alcohol polymer, such as boric acid, borax, glutaraldehyde, melamine, and oxalic acid, so that the resulting protective layer can be resistant to peeling due to humidity or heat and can have high light transmittance or high degree of polarization. A polyvinyl alcohol adhesive is preferably used because of its good adhesion to the polarizer material, polyvinyl alcohol.

Pressure-sensitive adhesives that have high transparency and low birefringence and can exhibit sufficient adhesive strength in the form of a thin layer are preferably used to laminate the polarizer and the transparent protective film of the norbornene resin-containing polymer film. Such a pressure-sensitive adhesive may be a dry laminating adhesive using a mixture of a polyurethane resin solution and a polyisocyanate resin solution, a styrene-butadiene rubber adhesive, or a two-part curable epoxy adhesive such as two components of an epoxy resin and polythiol and two components of an epoxy resin and polyamide. In particular, solvent type adhesives or two-part curable epoxy adhesives are preferred, and transparent adhesives are preferred. The adhesive force can be improved using an appropriate adhesive primer depending on the type of adhesives, and in the case of using such an adhesive, a certain adhesive primer is preferably used.

Any adhesive primer may be used as long as its layer can improve the adhesion properties. For example, the adhesive primer may be a so-called coupling agent such as a silane coupling agent having a hydrolyzable alkoxysilyl group and a reactive functional group such as amino, vinyl, epoxy, mercapto, and chloro in the same molecule, a titanate coupling agent having an organic functional group and a titanium-containing hydrolyzable hydrophilic group in the same molecule, and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, the silane coupling agent-containing layer is preferred, because it is easy to handle industrially.

An adhesive or pressure-sensitive adhesive layer is preferably formed on one or both sides of the polarizing plate so that it can be easily stacked on a liquid crystal cell.

Any adhesive or pressure-sensitive adhesive may be used to form the adhesive or pressure-sensitive adhesive layer. For example, the base polymer for use in the adhesive is appropriately selected from acrylic polymers, silicone polymers, polyesters, polyurethanes, polyamides, polyvinyl ethers, vinyl acetate-vinyl chloride copolymers, modified polyolefins, and rubber polymers such as epoxy rubbers, fluororubbers, natural rubbers, and synthetic rubbers. In particular, acrylic pressure-sensitive adhesives are preferably used, because they have good optical transparency and good weather or heat resistance and exhibit suitable adhesion properties such as suitable wettability, cohesiveness, and adhesiveness.

The adhesive or pressure-sensitive adhesive may contain a crosslinking agent depending on its base polymer. If necessary, the pressure-sensitive adhesive layer may contain appropriate additives such as fillers or pigments of natural or synthetic resins, glass fibers or beads, or metal powder or any other inorganic powder, colorants, and antioxidants. The pressure-sensitive adhesive layer may also contain transparent fine particles so as to have light diffusion properties.

The transparent fine particles may have an average particle size of 0.5 to 20 µm and may comprise one or more of silica, calcium oxide, alumina, titania, zirconia, electrically-conductive inorganic fine particles of tin oxide, indium oxide, cadmium oxide, antimony oxide, or the like, and crosslinked or uncrosslinked organic fine particles of an appropriate polymer such as poly(methyl methacrylate) and polyurethane.

The adhesive or pressure-sensitive adhesive is generally used in the form of a solution with a solids content of about 10 to 50% by weight, which comprises a base polymer or composition thereof dissolved or dispersed in a solvent. The solvent may be appropriately selected and used from organic solvents such as toluene and ethyl acetate and water depending on the type of the adhesive.

A laminate of different compositions or types of adhesives or pressure-sensitive adhesives may be formed on one or both sides of a polarizing plate or an optical film. The thickness of the adhesive or pressure-sensitive adhesive may be appropriately determined depending on the intended purpose and adhesive force and is generally from 1 to 500 μm, preferably from 5 to 200 μm, particularly preferably from 10 to 100 μm.

The surface of the adhesive or pressure-sensitive adhesive layer to be exposed is temporarily bonded to and covered with a release paper or a release film (also referred to as a separator) until use. This prevents the adhesive or pressure-sensitive adhesive layer from being touched during usual handling. The separator may be any appropriate conventional thin material such as a plastic film, a rubber sheet, a paper material, a fabric, a non-woven fabric, a net, a foamed sheet, a metal foil, and a laminate thereof, which are optionally coated with an appropriate release agent such as a silicone release agent, a long-chain alkyl release agent, a fluoro-release agent, and molybdenum sulfide.

Next, a description is given of other optical components for use in combination with the polarizing plate according to this embodiment. Examples of other optical components include, but are not limited to, a reflective or semi-transmissive polarizing plate that is a laminate of an elliptically or circularly polarizing plate and a reflecting plate or a semi-transmissive reflecting plate. A reflective or semi-transmissive elliptically polarizing plate may also be used, which comprises a combination of the reflective or semi-transmissive polarizing plate and a retardation plate. When used for transmissive or semi-transmissive liquid crystal displays, the antiglare hard-coated film 4, the antiglare antireflection hard-coated film 6 or the polarizing plate according to this embodiment may be used in combination with a commercially available brightness enhancement film (a polarized light separating film having a polarization selective layer, such as D-BEF manufactured by Sumitomo 3M Limited) to form a display with higher display performance.

The antiglare hard-coated film 4, the antiglare antireflection hard-coated film 6, the polarizing plate, or the like may also formed by sequentially stacking individual components in the process of manufacturing an image display. It is preferred, however, that the lamination should be performed in advance so that quality stability, lamination workability or the like can be high and that the efficiency of manufacturing a liquid crystal display or the like can be increased.

The antiglare hard-coated film 4, the antiglare antireflection hard-coated film 6, or the polarizing plate therewith according to this embodiment may be implemented in various types of image displays such as liquid crystal displays and organic electro-luminescent displays.

EXAMPLES

Preferred examples of the invention are illustratively described in detail below. Unless otherwise stated, the materials, contents and so on as shown in the examples are not intended to limit the scope of the invention in any way and are intended for illustration purposes only. In each example, "part or parts" and "%" are by weight, unless otherwise stated.

Example 1

There was prepared a resin material (Grandic PC1071 (trade name), manufactured by Dainippon Ink and Chemicals, Incorporated) containing a resin composition at a solid concentration of 66% in a mixed solvent of ethyl acetate and butyl acetate, in which the resin composition contained the A, B and C components and the photopolymerization initiator each shown below. To 100 parts of the resin material were added 30 parts of acrylic resin particles with an average particle size of 8 μm (1.49 in refractive index) and 0.5 parts of a reactive leveling agent, and the mixture was diluted with ethyl acetate such that the weight ratio of butyl acetate to ethyl acetate was set at 46:54 (the weight ratio of ethyl acetate to all the solvents was set at 54%) and that the solid concentration was set at 55%, so that a hard coat-forming material was prepared. The reactive leveling agent was a copolymer obtained by copolymerizing dimethylsiloxane, hydroxypropyl siloxane, 6-isocyanatehexyl isocyanurate, and an aliphatic polyester in a molar ratio of 6.3:1.0:2.2:1.0.

A component: urethane acrylate (100 parts) made from pentaerythritol acrylate and hydrogenated xylene diisocyanate;

B component: dipentaerythritol hexaacrylate (49 parts), pentaerythritol triacrylate (24 parts) and pentaerythritol tetraacrylate (41 parts);

C component: a mixture (59 parts) of a polymer and a copolymer each having the repeating unit represented by formula (1) above;

Photopolymerization initiator: Irgacure 184 (trade name, manufactured by Ciba Specialty Chemicals Inc.); and Mixed solvent: butyl acetate:ethyl acetate=89:11 (in weight ratio).

The hard coat-forming material was applied to an 80 μm-thick triacetylcellulose film (1.48 in refractive index) serving as a film substrate with a bar coater, and the coating film was dried by heating at 100° C. for 1 minute. The coating film was then cured by irradiation with ultraviolet light in an integrated amount of 300 mJ/cm$^2$ from a metal halide lamp to form a 25 μm-thick hard coat layer, so that an antiglare hard-coated film according to this example was prepared. The hard coat layer had a refractive index of 1.52. Almost all the fine particles had an aspect ratio of 1.05.

Example 2

An antiglare hard-coated film according to this example was prepared using the process of example 1, except that acrylic resin particles with an average particle size of 10 μm and a refractive index of 1.49 were used instead as the fine particles, the amount of the addition of the resin particles was 15 parts based on the amount of all the resin components, and the layer thickness was changed to 22 μm. Almost all the fine particles had an aspect ratio of 1.05.

Example 3

An antiglare hard-coated film according to this example was prepared using the process of example 2, except that the amount of the addition of the acrylic resin particles was changed to 30 parts based on the amount of all the resin components and that the thickness of the hard coat layer was changed to 33 μm.

Example 4

An antiglare hard-coated film according to this example was prepared using the process of example 3, except that the thickness of the hard coat layer was changed to 31 μm.

Example 5

An antiglare hard-coated film according to this example was prepared using the process of example 2, except that the thickness of the hard coat layer was changed to 24 μm.

Example 6

An antiglare hard-coated film according to this example was prepared using the process of example 2, except that the thickness of the hard coat layer was changed to 26 µm.

Example 7

An antiglare hard-coated film according to this example was prepared using the process of example 2, except that the thickness of the hard coat layer was changed to 21 µm.

Example 8

An antiglare hard-coated film according to this example was prepared using the process of example 1, except that acrylic-styrene resin particles with an average particle size of 10 µm and a refractive index of 1.51 were used instead as the fine particles, the amount of the addition of the resin particles was 20 parts based on the amount of all the resin components, and the layer thickness was changed to 22 µm. Almost all the fine particles had an aspect ratio of 1.05. The acrylic-styrene resin particles were obtained by emulsion polymerization of an acrylic monomer and a styrene monomer. The refractive index was adjusted by changing the mixing ratio between the acrylic monomer and the styrene monomer.

Example 9

An antiglare hard-coated film according to this example was prepared using the process of example 1, except that acrylic-styrene resin particles with an average particle size of 10 µm and a refractive index of 1.52 were used instead as the fine particles, the amount of the addition of the resin particles was 20 parts based on the amount of all the resin components, and the layer thickness was changed to 22 µm. Almost all the fine particles had an aspect ratio of 1.05.

Example 10

An antiglare hard-coated film according to this example was prepared using the process of example 1, except that acrylic-styrene resin particles with an average particle size of 10 µm and a refractive index of 1.53 were used instead as the fine particles, the amount of the addition of the resin particles was 20 parts based on the amount of all the resin components, and the layer thickness was changed to 23 µm. Almost all the fine particles had an aspect ratio of 1.05.

Example 11

An antiglare hard-coated film according to this example was prepared using the process of example 1, except that acrylic-styrene resin particles with an average particle size of 10 µm and a refractive index of 1.54 were used instead as the fine particles, the amount of the addition of the resin particles was 20 parts based on the amount of all the resin components, and the layer thickness was changed to 22 µm. Almost all the fine particles had an aspect ratio of 1.05.

Example 12

An antiglare hard-coated film according to this example was prepared using the process of example 1, except that acrylic resin particles with an average particle size of 15 µm and a refractive index of 1.49 were used instead as the fine particles, the amount of the addition of the resin particles was 25 parts based on the amount of all the resin components, the solid concentration of the hard coat-forming material was set at 35%, and the layer thickness was changed to 20 µm. Almost all the fine particles had an aspect ratio of 1.05.

Comparative Example 1

An antiglare hard-coated film according to this comparative example was prepared using the process of example 1, except that acrylic resin particles with an average particle size of 3 µm and a refractive index of 1.49 were used instead as the fine particles, the amount of the addition of the resin particles was 30 parts based on the amount of all the resin components, and the layer thickness was changed to 23 µm. Almost all the fine particles had an aspect ratio of 1.05.

Comparative Example 2

An antiglare hard-coated film according to this comparative example was prepared using the process of example 1, except that acrylic resin particles with an average particle size of 5 µm and a refractive index of 1.49 were used instead as the fine particles, the amount of the addition of the resin particles was 30 parts based on the amount of all the resin components, and the layer thickness was changed to 20 µm. Almost all the fine particles had an aspect ratio of 1.05.

Comparative Example 3

A hundred parts of an ultraviolet-curable resin, 0.5 parts of a leveling agent (Defenser MCF323), 6.5 parts of silicon oxide particles with an average particle size of 1.3 µm (Sylophobic 100, manufactured by Fuji Silysia Chemical Ltd.), 7.5 parts of silicon oxide particles with an average particle size of 2.5 µm (Sylophobic 702, manufactured by Fuji Silysia Chemical Ltd.), and 5 parts by weight of a polymerization initiator (trade name: Irgacure 184) were mixed and diluted with toluene to form a hard coat-forming material with a solid concentration of 45%. The ultraviolet-curable resin was composed of 40% of urethane acrylate, 40% of polyester acrylate and 20% of butyl acetate.

The hard coat-forming material was applied to an 80 µm-thick triacetylcellulose film (1.48 in refractive index) serving as a film substrate with a bar coater, and the coating film was dried by heating at 100° C. for 3 minutes. The coating film was then cured by irradiation with ultraviolet light in an integrated amount of 300 mJ/cm$^2$ from a metal halide lamp to form a 3 µm-thick hard coat layer, so that an antiglare hard-coated film according to this comparative example was prepared. The hard coat layer had a refractive index of 1.53. Almost all the fine particles had an aspect ratio of 1.6 or more.

Comparative Example 4

An antiglare hard-coated film according to this comparative example was prepared using the process of comparative example 3, except that 6.5 parts of silicon oxide particles with an average particle size of 1.8 µm (Sylophobic 200, manufactured by Fuji Silysia Chemical Ltd.) and 6.5 parts of silicon oxide particles with an average particle size of 2.5 µm (Sylophobic 702, manufactured by Fuji Silysia Chemical Ltd.) were used instead as the fine particles and that the layer thickness was changed to 8 µm. Almost all of each type of the fine particles had an aspect ratio of 1.6 or more.

Comparative Example 5

An antiglare hard-coated film according to this comparative example was prepared using the process of comparative example 3, except that 13 parts of silicon oxide particles with an average particle size of 1.3 µm (Sylophobic 200, manufactured by Fuji Silysia Chemical Ltd.) were used instead as the fine particles, the solid concentration of the hard coat-forming material was set at 40%, and the layer thickness was changed to 6 µm. Almost all the fine particles had an aspect ratio of 1.6 or more.

Comparative Example 6

An antiglare hard-coated film according to this comparative example was prepared using the process of comparative example 3, except that 14 parts of polystyrene particles with an average particle size of 3.5 µm (trade name: SX350H, manufactured by Soken Chemical & Engineering Co., Ltd.) were used instead as the fine particles and that the layer thickness was changed to 5 µm. Almost all the fine particles had an aspect ratio of 1.6 or more.

Comparative Example 7

An antiglare hard-coated film according to this comparative example was prepared using the process of example 1, except that acrylic resin particles with an average particle size of 10 µm and a refractive index of 1.49 were used instead as the fine particles, the amount of the addition of the resin particles was 3 parts based on the amount of all the resin components, and the layer thickness was changed to 20 µm. Almost all the fine particles had an aspect ratio of 1.6 or more.

Reference Example 1

The antireflection layer-forming material described below was applied to the antiglare hard-coated film obtained in comparative example 6, dried and cured, so that an antiglare antireflection hard-coated film having a 100 nm-thick antireflection layer was prepared.

The antireflection layer was formed as follows. First, a siloxane oligomer with an ethylene glycol-equivalent average molecular weight of 500 to 10000 (Colcoat N103 with a solids content of 2% by weight, manufactured by Colcoat Co., Ltd.) was provided as a material for forming an antireflection layer, and its number average molecular weight was measured. As a result, its number average molecular weight was 950. Opstar JTA-105 (trade name, with a solids content of 5% by weight, manufactured by JSR Corporation) was also provided, which was a fluorine compound with a polystyrene-equivalent number average molecular weight of 5000 or more having a fluoroalkyl structure and a polysiloxane structure. The number average molecular weight of this fluorine compound was measured, and as a result, its polystyrene-equivalent number average molecular weight was 8000. JTA 105A (with a solids content of 5% by weight, manufactured by JSR Corporation) was used as a curing agent.

An antireflection layer-forming agent was then prepared by mixing 100 parts of Opstar JTA-105, 1 part of JTA-105A, 590 parts of Colcoat N103, and 151.5 parts of butyl acetate. The antireflection layer-forming material was applied to the hard coat layer with a die coater in such a manner that the coating had the same width as that of the hard coat layer. The coating was then dried and cured by heating at 120° C. for 3 minutes to form an antireflection layer (a low-refractive index layer with a thickness of 0.1 µm and a refractive index of 1.43). As a result, an antiglare antireflection hard-coated film with a reflectance of 2.2% was prepared.

Refractive Indices of Transparent Plastic Film Substrate and Hard Coat Layer

The refractive indices of the transparent plastic film substrate and the hard coat layer were measured with an Abbe refractometer manufactured by Atago Co., Ltd. Specifically, the refractive index was measured with a measuring beam incident on the measurement surface of each of the transparent plastic film substrate and the hard coat layer, according to the measurement method specified for the refractometer.

Refractive Index of Fine Particles

The refractive index of each type of fine particles was measured as follows. The fine particles were placed on a slide glass, and a drop of a refractive index standard solution was put on the fine particles. A cover glass was placed thereon so that a sample was prepared. The sample was observed with a microscope, and the refractive index of a certain refractive index standard solution with which the contour of the fine particles at the interface was most difficult to see was defined as the refractive index of the fine particles.

Thickness of Hard Coat Layer

Concerning the thickness of the hard coat layer, measurement was performed using a microgauge type thickness gauge manufactured by Mitutoyo Corporation. The thickness of the hard coat layer was calculated by subtracting the thickness of the transparent plastic film substrate from the measured thickness of the antiglare hard-coated film composed of the substrate and the antiglare hard coat layer provided thereon. The results are shown in tables 1 and 2.

Thickness of Antireflection Layer

The thickness of the antireflection layer was calculated using an instantaneous multichannel photodetector system MCPD-2000 (trade name) manufactured by Otsuka Electronics Co., Ltd., based on the waveform data of the resulting interference spectrum.

Reflectance

A black acrylic plate manufactured by Mitsubishi Rayon Co., Ltd. (2.0 mm in thickness) was bonded with an about 20 µm-thick pressure-sensitive adhesive to the hard coat layer-free side (back side) of the transparent plastic film substrate so that there was no reflection of light from the back side. The spectral reflectance (specular reflectance+diffuse reflectance) of the front side was then measured using a spectrophotometer (UV2400PC with an 80-inclined integrating sphere, manufactured by Shimadzu Corporation), and the reflectance was calculated according to the formula: C illuminant/total reflectance of 20 visual field (Y value).

Pencil Hardness

The resulting hard-coated film was bonded to a glass plate with an about 20 µm-thick pressure-sensitive adhesive, and the film was then subjected to a pencil hardness test according to JIS K 5400 (under a load of 500 g). The results are shown in tables 1 and 2.

Haze

In the haze measurement method, a haze meter HR300 (manufactured by Murakami Color Research Laboratory) was used for measurement according to JIS K 7136 (haze (cloudiness)). The results are shown in tables 1 and 2.

Glossiness

Glossiness was measured according to JIS K 7105 (1981) at a measurement angle of 60° with Digital Variable Gloss Meter UGV-5DP manufactured by Suga Test Instrument Co., Ltd.

Arithmetic Average Surface Roughness Ra and Average Slope Angle θa

The antiglare hard coat layer-free side of the antiglare hard-coated film was bonded to a glass (1.3 mm in thickness) manufactured by Matsunami Glass Ind., Ltd. with a pressure-sensitive adhesive. The measurement was performed with a high-precision micro figure measuring instrument (Surfcorder ET4000 (trade name) manufactured by Kosaka Laboratory Ltd.), and according to JIS B 0601 (1994), the arithmetic average surface roughness Ra and the average spacing of irregularities Sm were determined from the measurement. The average slope angle θa value was also automatically calculated in the measuring instrument.

Display Contrast (1) The prepared antiglare hard-coated film was bonded to a smooth-surface polarizing plate (50 mm×50 mm) through an about 20 μm-thick acrylic pressure-sensitive adhesive attached to the antiglare hard coat layer-free side of the antiglare hard-coated film.

(2) The antiglare hard-coated film-attached polarizing plate was bonded to the central portion of a panel (Panel Model No. LQ150X1LAJO) manufactured by Sharp Corporation.

(3) A photo detector (Spectroradiometer CS1000A, manufactured by MINOLTA) was placed 50 cm above and parallel to the polarizing plate-equipped panel, and a ring light (37 mm in diameter, MHF-G150LR manufactured by Moritex Corporation) was placed at a height of 27 mm. In this setting, light from the ring light was incident at an angle of 30° on the panel.

(4) The illuminance was adjusted to 1000 Lx using an illuminometer (Illuminance Meter, manufactured by Topcon Corporation).

(5) A black image and a white image were each displayed on the panel. When black or white was displayed, the brightness at the central portion of the polarizing plate was measured as the brightness of black or white. Based on the measurements, the contrast ratio (the brightness of white/the brightness of black) was calculated.

(6) A reference contrast ratio was measured using the above processes (1) to (5) and using a hard-coated film that was prepared using the process of example 1, except that the fine particles were not added. The measured value (312) was normalized as 100. Concerning the characteristic values of the surface roughness of the reference hard-coated film, the Ra and θa values were 0.003 μm and 0.06°, respectively.

Antiglare Properties (1) A black acrylic plate manufactured by Mitsubishi Rayon Co., Ltd. (2.0 mm in thickness) was bonded with a pressure-sensitive adhesive to the hard coat layer-free side (back side) of the antiglare hard-coated film so that there was no reflection of light from the back side.

(2) The antiglare properties of the prepared film sample were visually examined in an office environment (about 1000 Lx) for usual use of displays. The criteria in the visual examination were as follows: ⊙: the case where there was little glare on images; ○: the case where there was glare on images but there was little effect on the visibility; Δ: the case where there was glare on images but there was no practical problem; and x: the case where there was glare on images.

Black Density (1) The prepared antiglare hard-coated film was bonded to a smooth-surface polarizing plate through an about 20 μm-thick acrylic pressure-sensitive adhesive attached to the antiglare hard coat layer-free side of the antiglare hard-coated film.

(2) The antiglare hard-coated film-attached polarizing plate was mounted on a panel (Panel Model No. LQ150X1LAJO) manufactured by Sharp Corporation.

(3) The panel was driven to display black in an office environment (about 1000 Lx) for usual use of the display, and the black density was visually examined. The criteria in the visual examination were as follows: ⊙: the case where black was graded very good; ○: the case where black was graded good; Δ: the case where black was slightly light but there was no practical problem; and x: the case where white blurring occurred.

TABLE 1

| | Layer Thickness (μm) | Fine Particle Material | Refractive Index of Fine Particles | Amount of Fine Particles (parts) | Average Particle Size of Fine Particles (μm) | Shape of Fine Particles | Refractive Index of Hard Coat Layer |
|---|---|---|---|---|---|---|---|
| Example 1 | 25 | Acrylic Resin | 1.49 | 30 | 8 | Shpere | 1.52 |
| Example 2 | 22 | Acrylic Resin | 1.49 | 15 | 10 | Shpere | 1.52 |
| Example 3 | 33 | Acrylic Resin | 1.49 | 30 | 10 | Shpere | 1.52 |
| Example 4 | 31 | Acrylic Resin | 1.49 | 30 | 10 | Shpere | 1.52 |
| Example 5 | 24 | Acrylic Resin | 1.49 | 30 | 10 | Shpere | 1.52 |
| Example 6 | 26 | Acrylic Resin | 1.49 | 30 | 10 | Shpere | 1.52 |
| Example 7 | 21 | Acrylic Resin | 1.49 | 30 | 10 | Shpere | 1.52 |
| Example 8 | 22 | Acrylic-Styrene Resin | 1.51 | 20 | 10 | Shpere | 1.52 |
| Example 9 | 22 | Acrylic-Styrene Resin | 1.52 | 20 | 10 | Shpere | 1.52 |
| Example 10 | 23 | Acrylic-Styrene Resin | 1.53 | 20 | 10 | Shpere | 1.52 |
| Example 11 | 22 | Acrylic-Styrene Resin | 1.54 | 20 | 10 | Shpere | 1.52 |
| Example 12 | 20 | Acrylic Resin | 1.49 | 25 | 15 | Shpere | 1.52 |
| Comparative Example 1 | 23 | Acrylic Resin | 1.49 | 30 | 3 | Shpere | 1.52 |
| Comparative Example 2 | 20 | Acrylic Resin | 1.49 | 30 | 5 | Shpere | 1.52 |
| Comparative Example 3 | 3 | Silicon Oxide | 1.46 | 6.5/7.5 | 1.3/2.5 | Polygon | 1.53 |
| Comparative Example 4 | 8 | Silicon Oxide | 1.46 | 6.5/6.5 | 1.8/2.5 | Polygon | 1.53 |
| Comparative Example 5 | 6 | Silicon Oxide | 1.46 | 13 | 1.3 | Polygon | 1.53 |

TABLE 1-continued

|  | Layer Thickness (μm) | Fine Particle Material | Refractive Index of Fine Particles | Amount of Fine Particles (parts) | Average Particle Size of Fine Particles (μm) | Shape of Fine Particles | Refractive Index of Hard Coat Layer |
|---|---|---|---|---|---|---|---|
| Comparative Example 6 | 5 | Polystyrene Resin | 1.59 | 14 | 3.5 | Shpere | 1.53 |
| Comparative Example 7 | 20 | Acrylic Resin | 1.49 | 3 | 10 | Shpere | 1.52 |
| Reference Example 1 | 5 | Polystyrene Resin | 1.59 | 14 | 3.5 | Shpere | 1.53 |

TABLE 2

|  | Haze | Glossiness | Ra (μm) | Sm (μm) | θa (°) | Pencil Hardness | Antiglare Properties | Display Contrast | Black Density |
|---|---|---|---|---|---|---|---|---|---|
| Example 1 | 55.8 | 78.3 | 0.080 | 67 | 0.82 | 4H | ○ | 67 | Δ |
| Example 2 | 35.8 | 78.5 | 0.115 | 166 | 0.45 | 4H | Δ | 81 | ○ |
| Example 3 | 63.8 | 80.6 | 0.077 | 75 | 0.68 | 4H | Δ | 67 | Δ |
| Example 4 | 57.4 | 74.5 | 0.153 | 161 | 0.76 | 4H | Δ | 86 | ○ |
| Example 5 | 55.5 | 77.0 | 0.081 | 93 | 0.85 | 4H | ○ | 76 | Δ |
| Example 6 | 48.7 | 74.2 | 0.105 | 72 | 0.93 | 4H | ○ | 80 | ○ |
| Example 7 | 58.5 | 52.0 | 0.080 | 47 | 1.490 | 4H | ○○ | 82 | ○ |
| Example 8 | 3.6 | 106.2 | 0.180 | 0.178 | 0.94 | 4H | ○ | 97 | ○○ |
| Example 9 | 2 | 100.5 | 0.179 | 0.155 | 0.99 | 4H | ○ | 96 | ○○ |
| Example 10 | 4.8 | 104.9 | 0.121 | 0.142 | 0.71 | 4H | Δ | 89 | ○ |
| Example 11 | 16.2 | 99.0 | 0.104 | 0.135 | 0.61 | 4H | Δ | 88 | ○ |
| Example 12 | 33.6 | 67.4 | 0.197 | 141 | 0.93 | 4H | ○ | 76 | Δ |
| Comparative Example 1 | 57.3 | 81.5 | 0.061 | 84 | 0.66 | 4H | Δ | 38 | x |
| Comparative Example 2 | 59.1 | 81.1 | 0.091 | 126 | 0.53 | 4H | Δ | 58 | x |
| Comparative Example 3 | 28.3 | 24.8 | 0.342 | 80 | 3.99 | 2H | ○○ | 25 | x |
| Comparative Example 4 | 10.8 | 41.9 | 0.213 | 89 | 2.2 | 2H | ○○ | 44 | x |
| Comparative Example 5 | 12.4 | 40.1 | 0.278 | 80 | 2.34 | 2H | ○○ | 31 | x |
| Comparative Example 6 | 44.3 | 49 | 0.184 | 99 | 1.47 | 3H | ○○ | 46 | x |
| Comparative Example 7 | 6.5 | 122.0 | 0.060 | 143 | 0.35 | 4H | x | 93 | Δ |
| Reference Example 1 | 40 | 46.2 | 0.149 | 0.101 | 1.37 | 3H | ○○ | 64 | Δ |

INDUSTRIAL APPLICABILITY

As described above, the antiglare hard-coated film of the invention includes a film substrate and an antiglare hard coat layer provided on at least one side of the film substrate and mainly composed of fine particles and a hard coat resin, wherein the fine particles have an average particle size of 6 μm to 15 μm and form irregularities with an average slope angle θa in the range of 0.4° to 1.5°, so that it can form a display having a display contrast of 60 or more at a bright place in a practical environment. The hard-coated film of the invention is favorably used with a pressure-sensitive adhesive or an adhesive to form an optical film such as a polarizing plate. A liquid crystal display (LCD) having such a polarizing plate have sufficient antiglare properties and sufficient display contrast properties even when used in a home television set, and thus it is favorably used.

The invention claimed is:

1. An antiglare hard-coated film, comprising:
    a transparent film substrate;
    a hard coat layer that is provided on at least one side of the transparent film substrate, contains fine particles and has an irregular surface, wherein
    the fine particles have an average particle size of 6 μm to 15 μm,
    the fine particles form irregularities with an average slope angle θa of 0.4° to 1.5°,
    the hard-coated film produces a display contrast characteristic of 60 or more, and
    the hard coat layer is made from a hard-coating material comprising a urethane acrylate (A), a polyol (meth)acrylate (B) and a (meth)acrylic polymer (C) having an alkyl group containing at least two hydroxyl groups;
    wherein the hard coat layer comprises 15% by weight to 55% by weight of urethane acrylate (A) based on a total content of all resins present in the hard coating layer;
    wherein the hard coat layer comprises 70% by weight to 180% by weight of polyol (meth)acrylate (B) based on the amount of urethane acrylate (A); and
    wherein the hard coat layer comprises 25% by weight to 110% by weight of (meth)acrylic polymer (C) based on the amount of urethane acrylate (A).

2. The antiglare hard-coated film according to claim 1, wherein the hard coat layer has a thickness of 15 μm to 35 μm.

3. The antiglare hard-coated film according to claim 1, wherein the fine particles have an approximate spherical shape.

4. A polarizing plate, comprising the antiglare hard-coated film according to claim 1.

5. An image display, comprising the polarizing plate according to claim 4.

6. An image display, comprising the antiglare hard-coated film according to claim 1.

7. The antiglare hard-coated film according to claim 1, wherein hard coat material contains the fine particles blended in an amount of from 2 to 70 parts by weight based on 100 parts by weight of the hard-coating material.

* * * * *